US009969497B2

(12) United States Patent
Gibbs

(10) Patent No.: US 9,969,497 B2
(45) Date of Patent: May 15, 2018

(54) NOISE AND DRAG REDUCING CABIN PRESSURE OUTFLOW VALVE

(71) Applicant: The Boeing Company, Chicago, IL (US)

(72) Inventor: John H. Gibbs, Bothell, WA (US)

(73) Assignee: The Boeing Company, Chicago, IL (US)

( * ) Notice: Subject to any disclaimer, the term of this patent is extended or adjusted under 35 U.S.C. 154(b) by 833 days.

(21) Appl. No.: 14/502,633

(22) Filed: Sep. 30, 2014

(65) Prior Publication Data
US 2016/0091112 A1   Mar. 31, 2016

(51) Int. Cl.
| | | |
|---|---|---|
| B64D 13/00 | (2006.01) | |
| E04B 1/00 | (2006.01) | |
| B64D 13/02 | (2006.01) | |
| G05D 16/20 | (2006.01) | |
| F15D 1/00 | (2006.01) | |

(52) U.S. Cl.
CPC ........... *B64D 13/02* (2013.01); *G05D 16/202* (2013.01); *F15D 1/004* (2013.01); *F15D 1/008* (2013.01); *F15D 1/0055* (2013.01); *F15D 1/0095* (2013.01)

(58) Field of Classification Search
CPC .......... B64D 13/02; B64D 33/02; B64C 21/06
USPC .......... 244/117 R, 129.5, 209; 137/630, 601; 454/70, 105
See application file for complete search history.

(56) References Cited

U.S. PATENT DOCUMENTS

| | | | | |
|---|---|---|---|---|
| 3,426,984 A | * | 2/1969 | Emmons ................ | B64D 13/02 244/117 R |
| 3,740,006 A | * | 6/1973 | Maher .................... | B64D 13/02 244/1 N |
| 5,984,773 A | * | 11/1999 | Gervais ............. | B61D 27/0009 454/105 |
| 6,273,136 B1 | * | 8/2001 | Steinert ................. | B64D 13/02 137/601.08 |
| 7,048,230 B2 | * | 5/2006 | Meyer .................... | B64D 33/02 244/130 |
| 2012/0037760 A1 | * | 2/2012 | Koppelman ........... | B64C 21/06 244/209 |

(Continued)

FOREIGN PATENT DOCUMENTS

EP        2 418 147        2/2012

*Primary Examiner* — Helena Kosanovic
*Assistant Examiner* — Wes Anderson, Jr.
(74) *Attorney, Agent, or Firm* — Miller, Matthias & Hull LLP

(57) ABSTRACT

A system and method for regulating pressure inside a vehicle ("cabin pressure") is disclosed. The system can include a forward gate and an aft gate that can be moved from a closed position to an open position to release cabin pressure in a controlled manner. The forward gate, the aft gate, or both can comprise an interior cavity and one or more permeable surfaces. When open, or partially open, an airflow can be created by a pressure differential between the cabin pressure and the pressure outside the vehicle ("atmospheric pressure"). At least a portion of the airflow can flow through the one or more permeable surfaces and the hollow cavity of the forward gate, the aft gate, or both to promote laminar flow through the gates and into the atmosphere alongside the vehicle (e.g., an aircraft fuselage). In this manner, flow efficiency can be increased and noise reduced.

15 Claims, 10 Drawing Sheets

(56) References Cited

U.S. PATENT DOCUMENTS

2016/0159465 A1\* 6/2016 Koppelman ............ B64C 21/06
244/209

\* cited by examiner

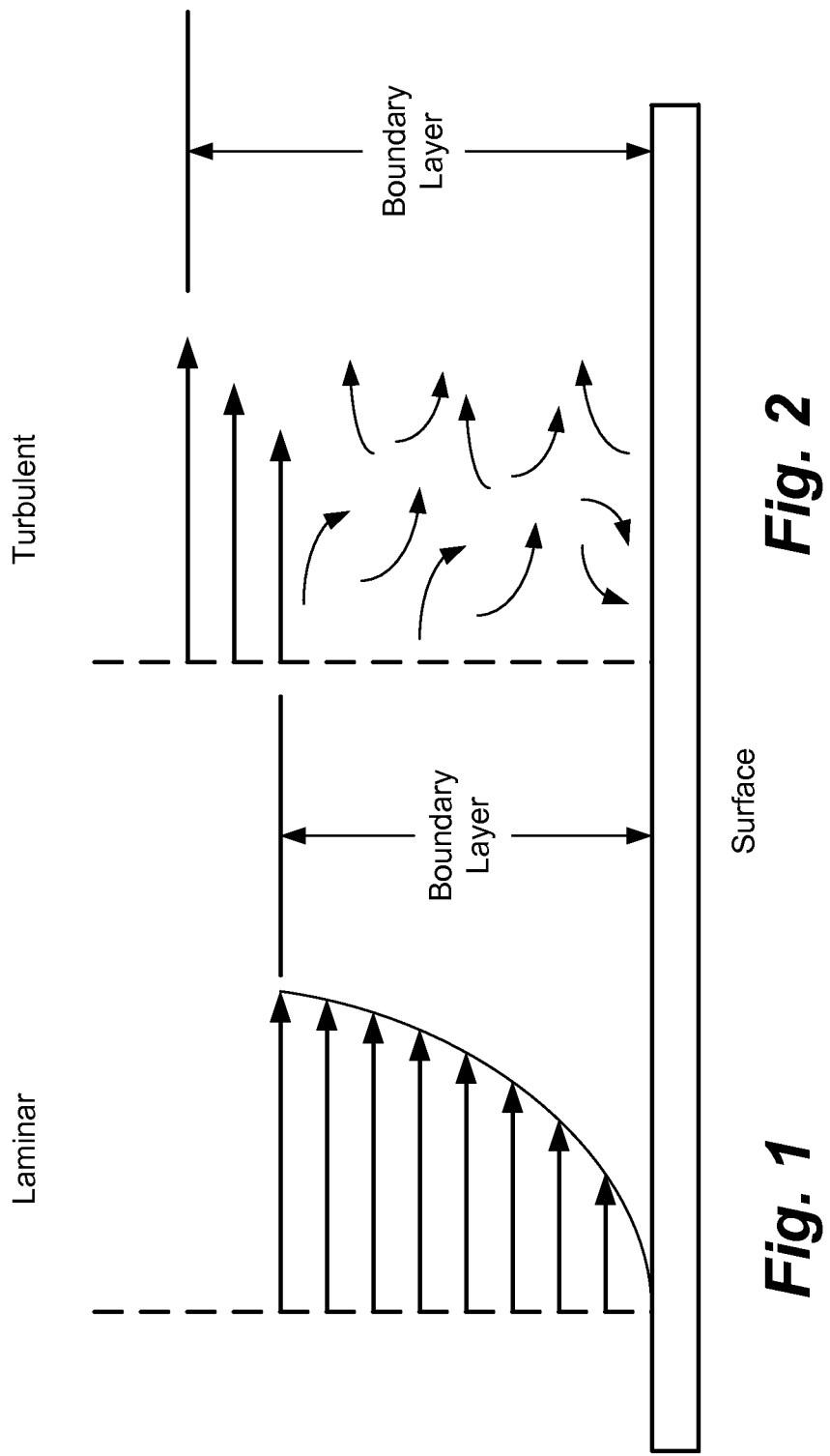

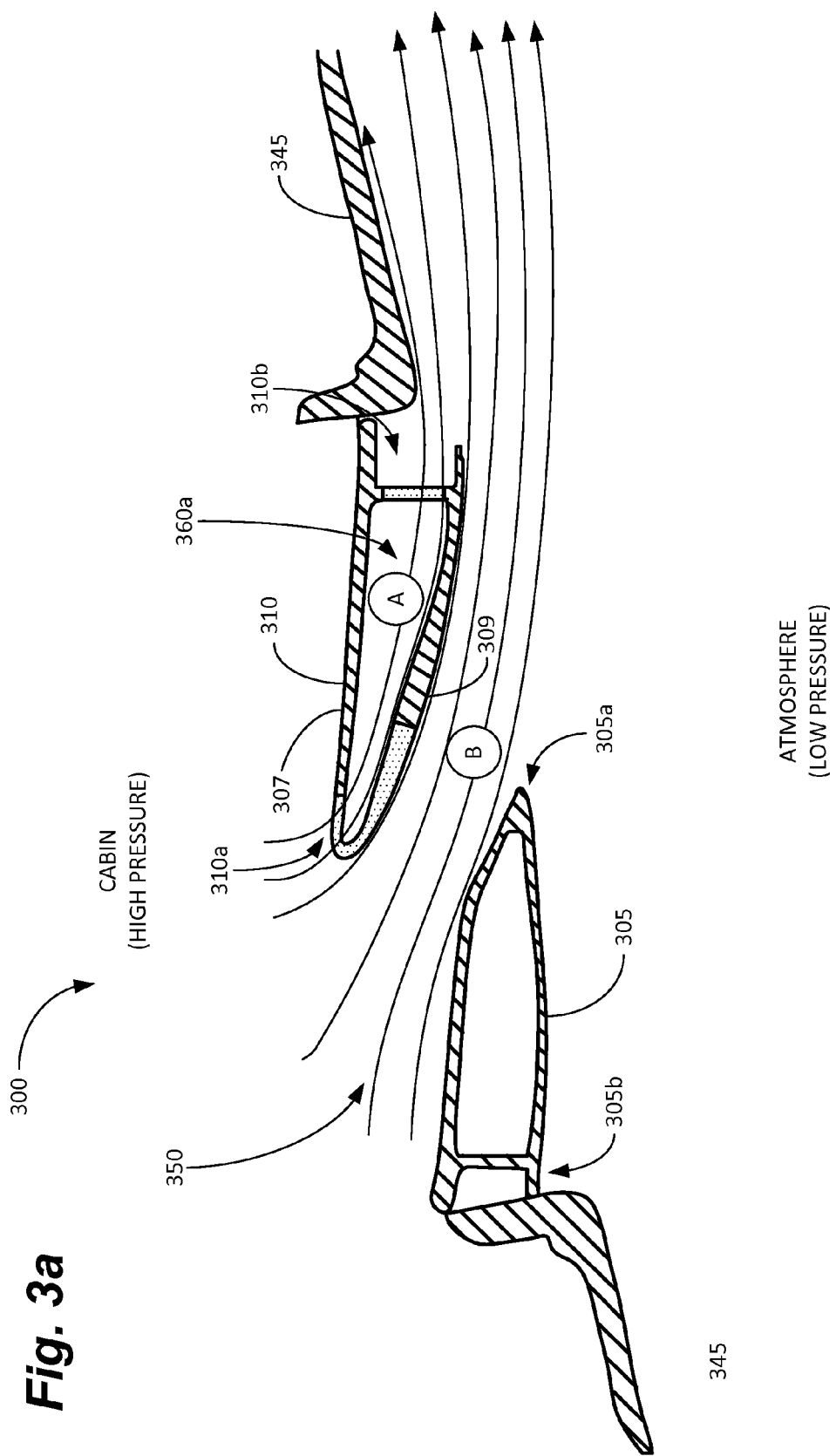

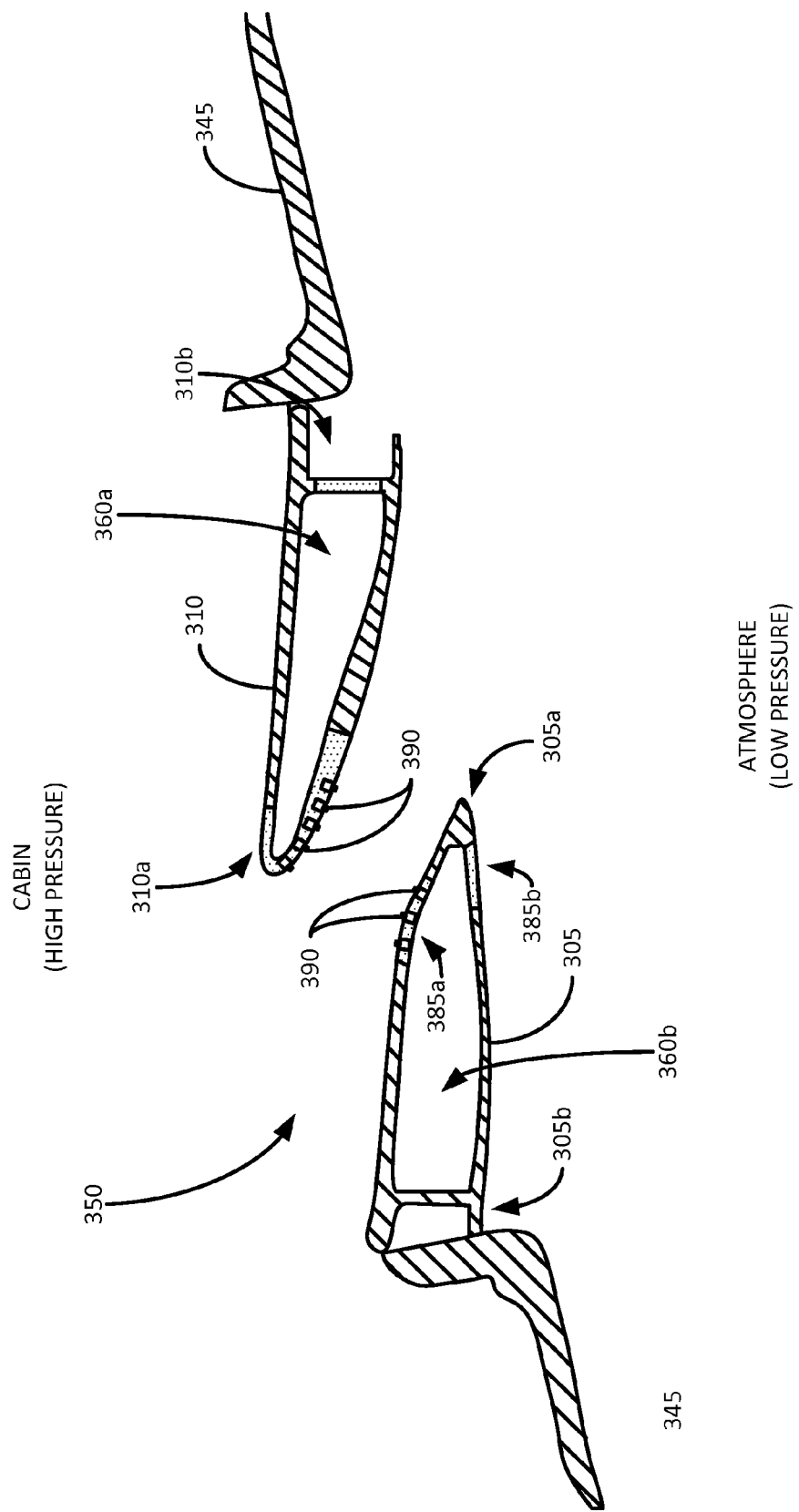

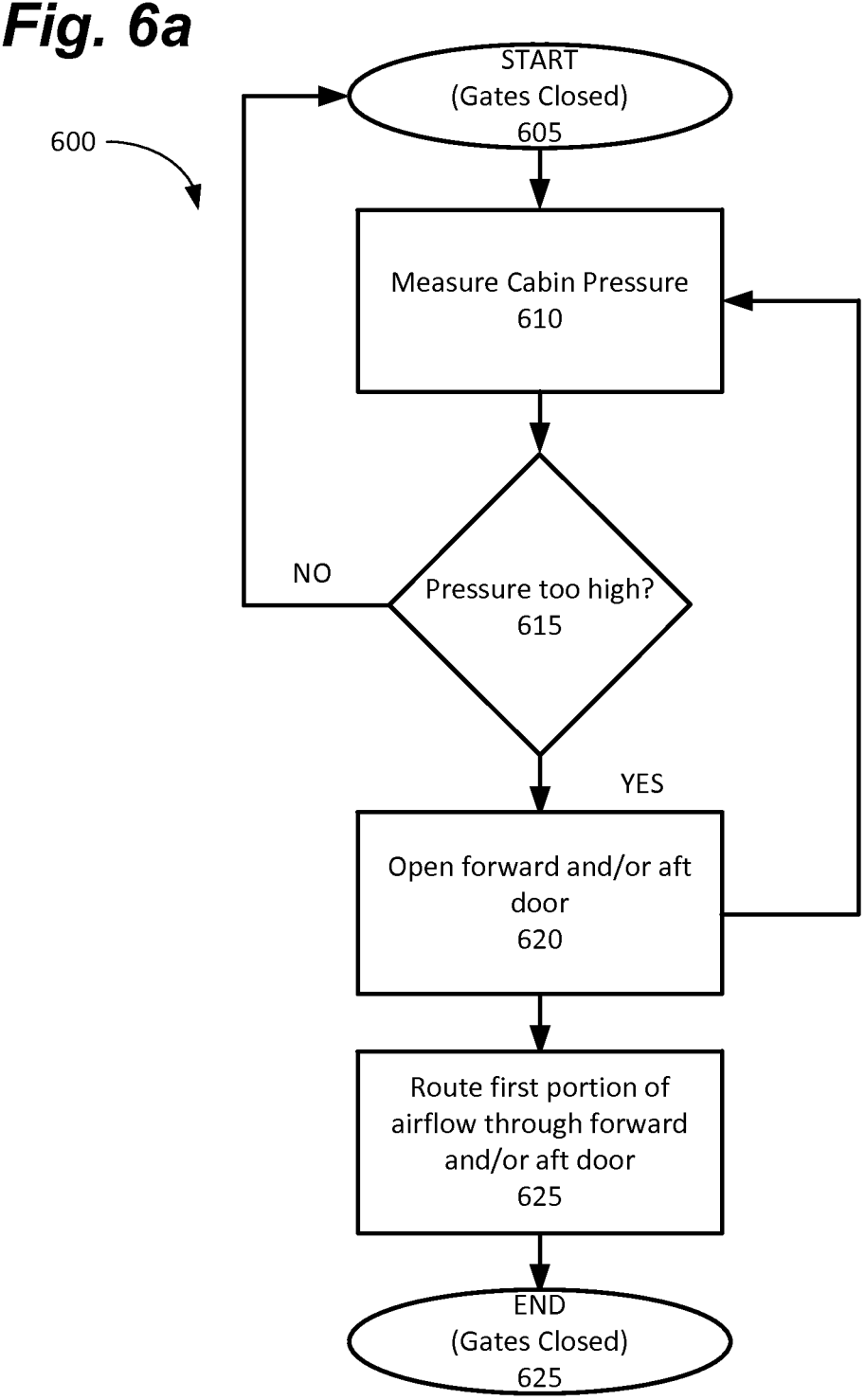

NOISE AND DRAG REDUCING CABIN PRESSURE OUTFLOW VALVE

FIELD

Embodiments of the present disclosure relate generally to cabin outflow pressure valves and specifically to improved cabin pressure outflow valves for aircraft utilizing hybrid laminar flow control for reduced interior cabin noise and reduced external drag.

BACKGROUND

Commercial aircraft fly at very high altitudes. This is because, at least in part, the relatively thinner air at higher altitudes reduces drag. As a result, modern commercial aircraft fly in the range of approximately 30,000-45,000 feet above sea level (ASL), while private jets may fly as high as 51,000 feet ASL. And, while flying at this altitude increases efficiency, it also requires that some technical difficulties to be overcome.

One of these difficulties is that the air at these altitudes does not contain enough oxygen to sustain human life. At altitudes above approximately 12,000-14,000 feet ASL, most humans begin to suffer from altitude induced hypoxia. Early solutions to this problem included oxygen mask systems for providing additional oxygen directly to users. Such systems are still used in fighter aircraft, for example, where oxygen need only be provided for one or two users. In large commercial aircraft, however, oxygen mask systems are impractical due to, for example, the number of passengers, size and space requirements, and the need for passengers and flight attendants to be able to move about the cabin.

A more practical solution to this problem is to pressurize the cabin. This enables the cabin to simulate conditions at lower, safer altitudes (generally, similar conditions to those found at somewhere between 4,500 and 8,000 feet ASL). This feature was introduced in 1938 on the Boeing 307—the first commercial airliner with a pressurized cabin.

Conventionally, conditioned air is pumped into the cabin that is provided by, for example, bleed air off the compressor side of a turbine engine. Excess pressure in the cabin is then bled off using a Cabin Pressure Outflow Valve (CPOV). Conventional CPOVs do not, however, attempt to manage the airflow through and out of the valve. This can result in undesirable noise levels inside the cabin and additional drag on the fuselage of the aircraft, among other things.

It is with such considerations in mind that embodiments of valves for pressurized aircraft cabins are described.

SUMMARY

It should be appreciated that this Summary is provided to introduce a selection of concepts in a simplified form that are further described below in the Detailed Description. This Summary is not intended to be used to limit the scope of the claimed subject matter.

Embodiments of the present disclosure relate to a Cabin Pressure Outflow Valve (CPOV) having aerodynamic features that enable improved flow and reduced noise and turbulence.

Embodiments of the present disclosure can comprise a valve for regulating the interior pressure of a vehicle. In some embodiments, the valve can comprise a first gate, positionable between a closed position and an open position. The first gate can comprise a first interior cavity, a first permeable surface located proximate a leading edge of the first gate and in fluid communication with the interior cavity, and a second permeable surface located proximate a trailing edge of the first gate and in fluid communication with the interior cavity.

Embodiments of the present disclosure can also comprise a system for regulating the interior pressure of a vehicle. The system can comprise, for example, a valve comprising a first gate, positionable between a closed position and an open position. In some embodiments, the first gate can comprise an interior cavity, a first permeable surface located proximate a leading edge of the first gate and in fluid communication with the interior cavity, and a second permeable surface located proximate a trailing edge of the first gate and in fluid communication with the interior cavity. In some embodiments, the valve can also comprise an actuator coupled to the first gate and operable to move the gate between the closed and open positions and a controller configured to transmit signals to the actuator for controlling movement of the first gate.

Embodiments of the present disclosure can also comprise a method of operating a valve, comprising moving a first gate of a valve arranged in fluid communication with an interior and exterior of a vehicle between a first, closed position and a second, open position to allow air to flow out of the interior of the vehicle. In some embodiments, a first portion of the airflow can travel over an external surface of the first gate and a second portion of the airflow can travel through a first interior cavity of the first gate.

The features, functions, and advantages that have been discussed can be achieved independently in various embodiments of the present disclosure or may be combined in yet other embodiments, further details of which can be seen with reference to the following description and drawings.

BRIEF DESCRIPTION OF THE DRAWINGS

FIGS. 1 and 2 compare flow velocities over a surface in laminar (FIG. 1) and turbulent flow (FIG. 2).

FIGS. 3a and 3b depict a Cabin Pressure Outflow Valve (CPOV) incorporating Hybrid Laminar Flow Control (HLFC) on the aft gate, in accordance with some embodiments of the present disclosure.

FIG. 3d depicts a CPOV incorporating active flow control devices, in accordance with some embodiments of the present disclosure.

FIGS. 6a and 6b are flowcharts depicting a method for controlling the cabin pressure of a vehicle, in accordance with some embodiments of the present disclosure.

Figure 3B:
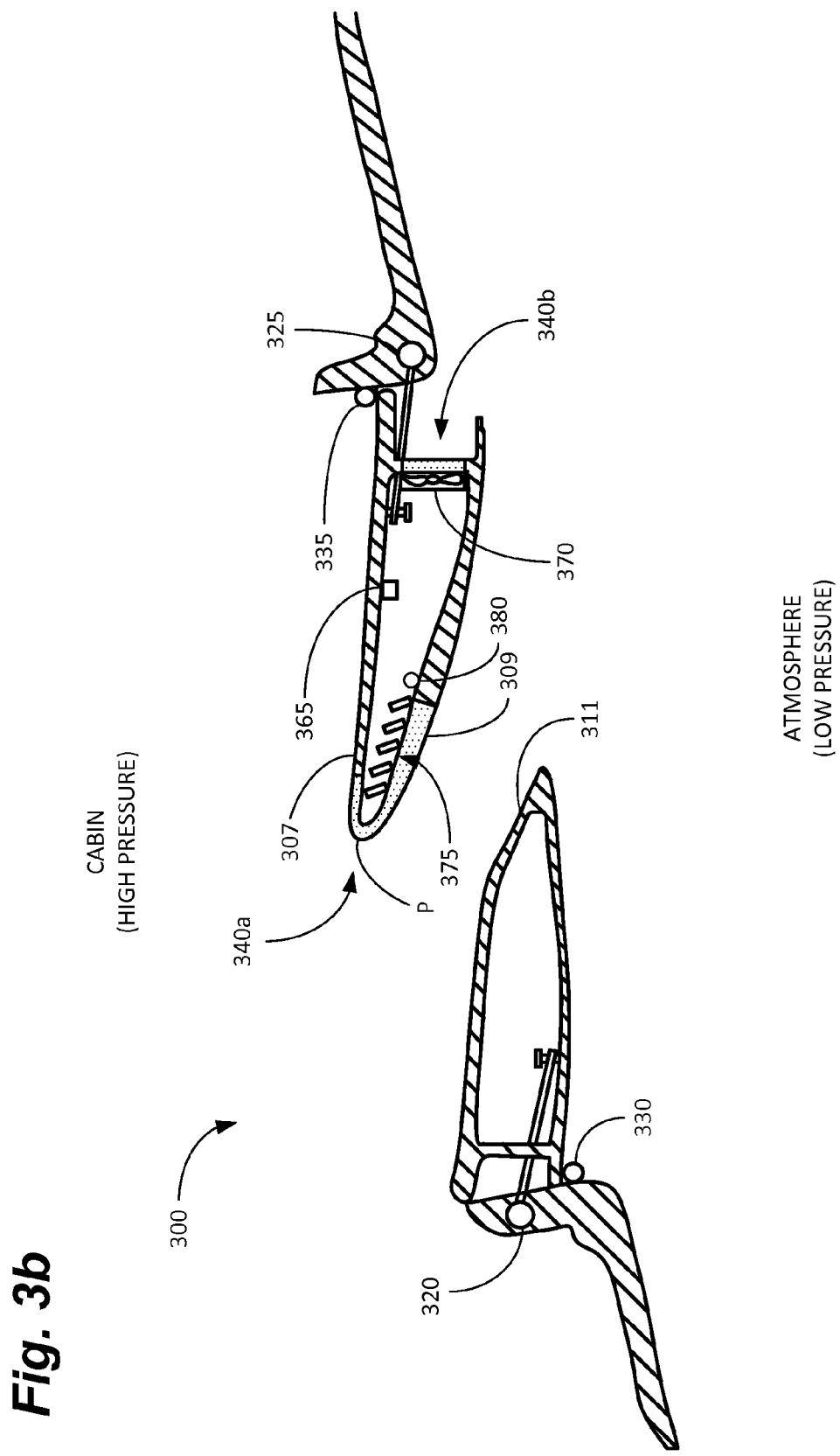

Each figure shown in this disclosure shows a variation of an aspect of the embodiment presented, and only differences will be discussed in detail.

DETAILED DESCRIPTION

Embodiments of the present disclosure relate generally to Cabin Pressure Outflow Valves (CPOVs), and more particularly to a system and method for use with CPOVs utilizing Hybrid Laminar Flow Control (HLFC) designed to improve flow and reduce turbulence therethrough. In some embodiments, the system can comprise a CPOV with HLFC including aerodynamic features to increase laminar flow through the valve. The system can comprise, for example, one or more perforated aerodynamic surfaces to enable airflow to be redirected through the aerodynamic surfaces, thus creating an area of low pressure in the boundary layer of same. In this manner, airflow "attachment" through the valve can be improved resulting in more laminar flow, less noise, and reduced turbulence, among other things.

To simplify and clarify explanation, the disclosure is described herein as a CPOV. One skilled in the art will recognize, however, that the disclosure is not so limited. The system can be used, for example and not limitation, with other types of valves in which a pressure differential exists from one side of the valve to the other (as is generally the case). The disclosure could be used to improve flow and reduce noise for various types of valves such as, for example and not limitation, pressure relief valves, pneumatic tool outlets, and venting systems.

The materials described hereinafter as making up the various elements of the present disclosure are intended to be illustrative and not restrictive. Many suitable materials that would perform the same or a similar function as the materials described herein are intended to be embraced within the scope of the disclosure. Such other materials not described herein can include, but are not limited to, materials that are developed after the time of the development of the disclosure.

Because the relative airflow over any surface must be zero at the surface, a boundary layer is formed above the surface. The boundary layer consists of the layers of air that are required to go from the velocity of an external airflow to zero at the surface. As shown in FIG. 1, the boundary layer may be laminar, in which each layer of air in the boundary layer smoothly adheres to the next layer, and the velocity slows to zero in a substantially smooth and parabolic manner from top to bottom. In other instances, however, some or all of the boundary layer may be turbulent. As shown, this results in a portion of the boundary layer becoming "detached" from the surfaced causing turbulent, chaotic airflow.

In many instances, the boundary layer can transition from laminar flow to turbulent flow over a certain distance or at a higher speed. Low speed flows, for example, tend to be more laminar, while high speed flows tend to become turbulent. The disorder caused by the chaotic airflow inherent in turbulent boundary layers can increase boundary layer height and thus, drag due to boundary layer skin friction. A turbulent boundary layer can also cause other problems such as, for example and not limitation, reduced effectiveness of flight control surfaces and increased noise.

As discussed above, one problem with conventional CPOVs is that little or no effort is made to manage the airflow through the valve during operation. As a result, a large portion of the flow through the valve is turbulent. This turbulent airflow can result in undesirable noise levels inside the passenger cabin and increased turbulence on the fuselage. To dampen the noise, heavy and expensive insulation materials are often used, which undesirably increase the cost and weight of the aircraft.

A conventional outflow valve can comprise one or more gates pivotally coupled to the aircraft. To release excess pressure from the cabin, the gates are pivoted to define a vent open to the atmosphere. Depending on the position of the gates, the vent is basically a variable converging-diverging nozzle. At the throat of the converging-diverging nozzle is an area in which the flow is choked (i.e., Mach=1) and, by definition, the area of the vent then limits the mass flow of air exiting the aircraft. As the valve opens and closes, the choke point moves in and out of the vent. In addition, due to the velocity of the flow, the airflow can separate from the surfaces of the one or more gates creating an area of turbulent flow. As mentioned above, this can increase drag on the aircraft and increase noise around the vent, including noise in the passenger cabin.

Figure 7:
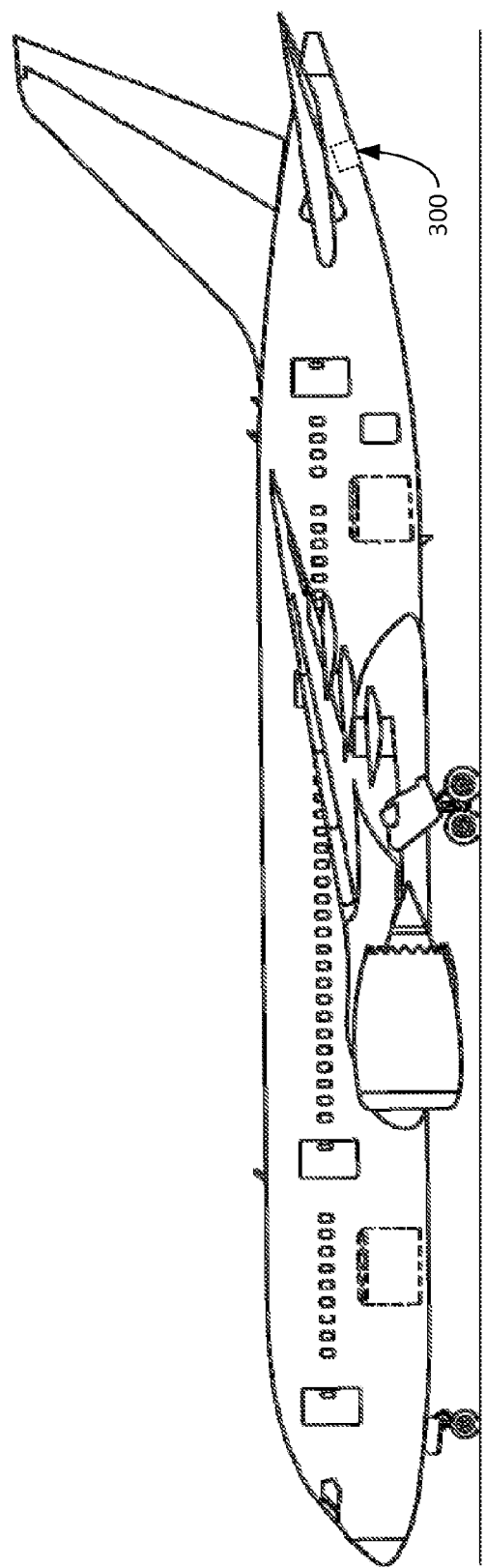
FIG. 7 depicts a CPOV on an aircraft, in accordance with some embodiments of the present disclosure.

With such considerations in mind, embodiments of the present disclosure relate to systems and methods for managing and/or improving airflow through a CPOV. As shown in FIGS. 3a and 3b, the system 300 may comprise a first, aft gate 310 and a second, forward gate 305. One or more of the forward gate 305 and/or the aft gate 310 may be hollow to enable HLFC through the main nozzle 350 from an interior portion of the aircraft (i.e., the cabin) to an exterior portion of the aircraft (i.e., the atmosphere). One or both of the gates 305, 310 can be opened and closed to control cabin air pressure. In some embodiments, the gates 305, 310 can be pivotally coupled to the aft portion of a vehicle (e.g., an aircraft). The gates 305, 310 can be constructed of light, strong materials such as, for example and not limitation, cast or machined aluminum, aluminum honeycomb, composite materials (e.g., fiberglass, carbon fiber, and Kevlar®)), or combinations thereof. In some embodiments, the system 300 can be located proximate an aft portion of the fuselage of an aircraft. See, e.g., FIG. 7.

In some embodiments, the forward gate 305 may be pivotally coupled to the aircraft to enable a first end 305a of the forward gate 305 to be pivoted about the second end 305b of the forward gate 305. Similarly, the aft gate 310 can be pivotally coupled to the aircraft to enable a first end 310a of the aft gate 310 to be pivoted about the second end 310b of the aft gate 310. In some examples, the forward gate 305 and/or the aft gate 310 may be pivotally coupled to the aircraft at an intermediate location along the length of the gates (e.g., at a location between the first ends 305a, 310a and the second ends 305b, 310b of the forward gate 305 and aft gate 310, respectively) in a butterfly-type valve configuration. The gates 305, 310 can be coupled to the aircraft using, for example and not limitation, hinges, pins, or pivot arms.

In this manner, the opening provided by the gates 305, 310 can be varied, and can be adjusted in conjunction with feedback from, for example, a cabin pressure sensor, to maintain the desired cabin pressure. The pressure differential from the inside of the cabin (high pressure) to the atmosphere (low pressure) causes airflow through the system 300 as the pressures attempt to equalize.

In some embodiments, the gates 305, 310 can be moved from a first, closed position to a second, open position by one or more actuators 320, 325. The actuators 320, 325 can comprise, for example and not limitation, servo motors, linear servos, or pneumatic or hydraulic actuators. In some embodiments, the actuators 320, 325 can comprise rotary servo motors. In some embodiments, one or both of the gates 305, 310 can further comprise one or more gate position sensors 330, 335 to provide feedback as to the current position of the gates 305, 310. The sensors 330, 335 can comprise, for example and not limitation, potentiometers, Hall Effect sensors, or capacitive transducers. In other embodiments, such as when a servo motor is utilized, the sensors 330, 335 can be integral to the actuators 320, 325.

In some embodiments, the aft gate 310 can comprise one or more permeable surfaces 340a, 340b in fluid communication with an interior cavity 360a defined between the first end 310a and the second end 310b of the aft gate 310. A first permeable surface 340a can be located, for example, proximate the first end 310a, or leading edge, of the aft gate 310 and a second permeable surface 340b can be located proximate the second end 310b, or trailing edge, of the aft gate 310. This configuration can enable a first portion of the airflow (A) to pass through the aft gate 310 (e.g., through an the interior cavity 360a of the aft gate 310), while a second portion of the airflow (B) can pass along an exterior surface of the aft gate 310 (e.g., the lower surface 309 of the aft gate 310).

In a conventional gate with no permeable surfaces, airflow would impinge on the first end 310a of the aft gate 310 and create a stagnation point (P). In some embodiments, therefore, as shown in FIG. 3b, the first permeable surface 340a at the first end 310a of the aft gate 310 can span a portion of the upper surface 307 and a portion of the lower surface 309 of the aft gate 310. In this configuration, rather than creating a stagnation point (P), the high pressure air in this location can cause air to flow through the first, interior cavity 360a from the first end 310a to the second end 310b of the aft gate 310.

In some embodiments, the permeable surfaces 340a, 340b can comprise, for example and not limitation, perforations, slots, or louvers. In some embodiments, the permeable surfaces 340a, 340b can comprise a plurality of holes formed in the aft gate 310 of varying diameters based on their location. In other embodiments, the permeable surfaces 340a, 340b can comprise channels, corrugations, screens, or other passages. The position, layout, size, and number of permeable surfaces 340a, 340b can be varied based on, for example and not limitation, a particular system 300 location on the aircraft, the aircraft shape and size, or cabin pressurization level.

As described herein, a portion of the flow (e.g., airflow A) may be passively drawn through the holes, perforations, slots, or louvers 340a at the leading edge 310a of aft gate 310. The airflow passes through the interior 360a of the aft gate 310 and exits through the holes, perforations, slots, or louvers 340b at the trailing edge 310b of aft gate 310. In this manner, the flow through the aft gate 310 can create an area of low pressure proximate the first end 310a of the aft gate 310, which may increase the area of laminar flow along the exterior surface of the aft gate 310 (e.g., along lower surface 309). In other words, the flow (A) through the aft gate 310 can "suck" the airflow (B) to the bottom surface of the aft gate 310 enabling the flow to remain "attached." The flows (A) and (B) can also be more easily blended as they exit the system 300 to enable the flow downstream of the system 300 to be less turbulent. Airflow through the system 300 (e.g., from the interior of the cabin to the atmosphere) can be caused by a pressure differential between the cabin pressure (high) and the outside, or atmospheric, pressure (low). Thus, the flow through, and over, the aft gate 310 comprises cabin air that is being exhausted into the atmosphere.

As shown in FIG. 3a, when the airflow (B) remains attached to the lower surface 309 of the aft gate 310, the area of turbulent flow below the aft gate 310 is reduced or eliminated. This increases the efficiency of the system 300 and reduces noise caused by turbulence and supersonic flow, among other things. In addition, behind the aft gate 310, the more laminar airflow (B) can be more smoothly blended such that turbulence along the fuselage 345 downstream from the system 300 can also be reduced.

In some embodiments, the permeable surfaces 340a, 340b can comprise both active and passive elements. In some embodiments, passive elements can include, for example, fixed vortex generators configured to mix the boundary layer flow with mainstream flow to delay, or prevent, flow separation. In other embodiments, the system 300 can comprise textured or rough surfaces to create early transition to turbulent flow, thus to delaying, or preventing, flow separation.

As shown in FIG. 3b, in some embodiments, the passive aerodynamic effect caused by the permeable surfaces 340a, 340b can be supplemented with, for example and not limitation, bleed air, a vacuum pump, or a fan 370 to further increase flow (A) through the interior of the gate 310. In still other embodiments, the system 300 can further comprise moveable surfaces 375 (e.g., louvers, gate valves, or doors) to vary the area of the permeable surfaces 340 that are in fluid communication with the first cavity 360a of the aft gate 310. In some embodiments, the moveable surfaces 375 can further comprise one or more position sensors 380 to monitor their position.

Figure 3C:
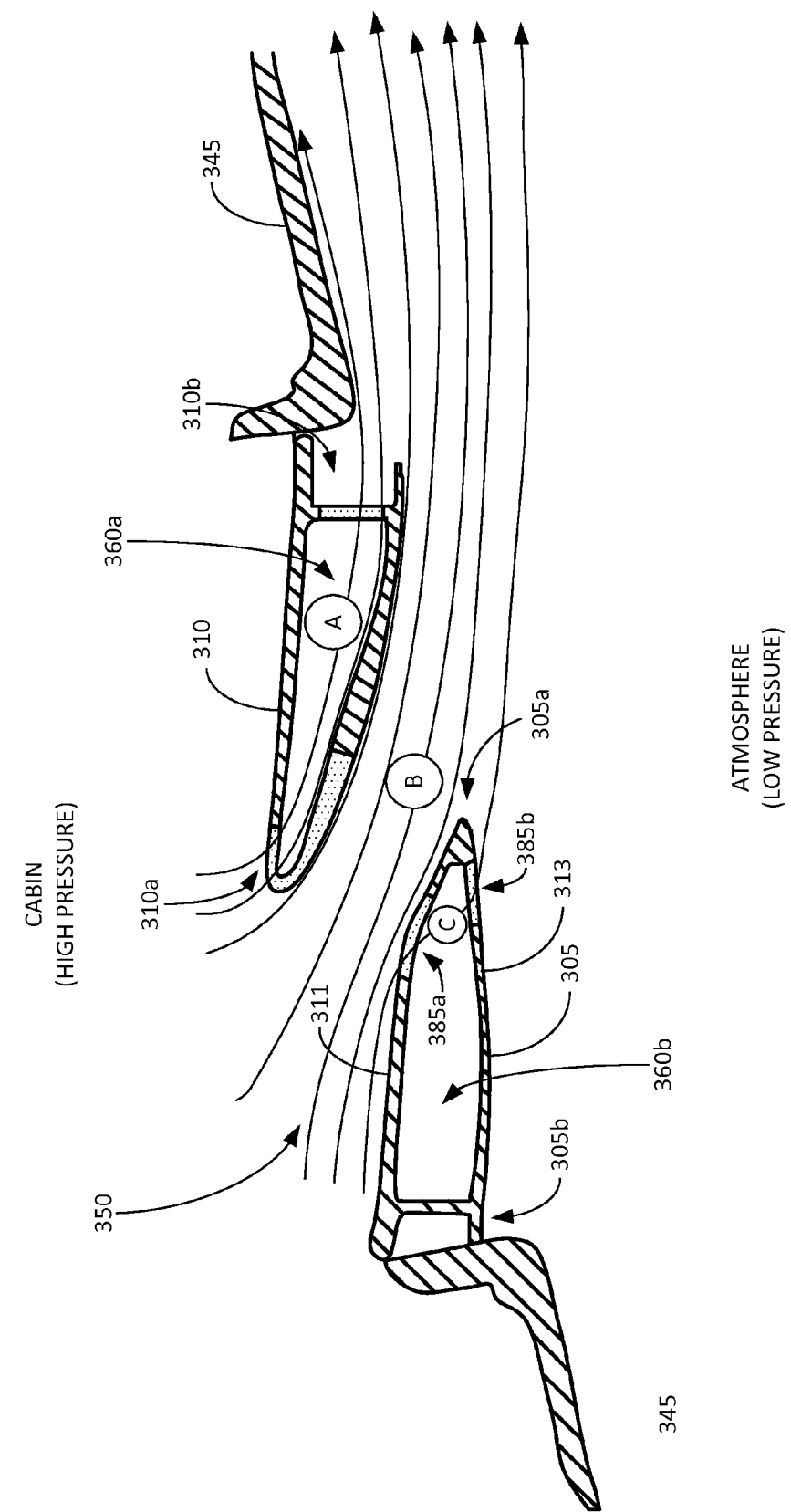
FIG. 3c depicts a CPOV incorporating HLFC on both the forward and aft gate, in accordance with some embodiments of the present disclosure.

In still other embodiments, as shown in FIG. 3c, the forward gate 305 can also comprise one or more permeable surfaces. In some embodiments, the forward gate 305 can comprise a third, permeable surface 385a proximate an upstream portion 311 of the forward gate 305 and a fourth permeable surface 385b proximate a downstream portion 313 of the forward gate 305. In some embodiments, the permeable surfaces 385a, 385b can comprise, for example and not limitation, perforations, slots, or louvers in fluid communication with a second interior cavity 360b fluidly coupling the permeable surfaces 385a and 385b. Like the aft gate 310, in some embodiments the permeable surfaces 385a, 385b can comprise, for example, a plurality of holes formed in the forward gate 305 of varying diameters based on their location. In other embodiments, the permeable surfaces 385a, 385b can comprise channels, corrugations, screens, or other passages. The position, layout, size, and number of permeable surfaces 385a, 385b can be varied based on, for example and not limitation, a particular system 300 location on the aircraft, the aircraft shape and size, or cabin pressurization level.

In this manner, the flow through the forward gate 305 can create an area of low pressure proximate the first end 305a of the forward gate 305 to increase the area of laminar flow along the exterior surface of the forward gate 305 (e.g., along the top surface 311 of the forward gate 305). In other words, the flow (C) through the aft gate 310 can "suck" the main airflow (B) to the top surface 311 of the forward gate 305 enabling the flow to remain "attached" to the forward gate 305. Because the main flow (B) remains attached and is more laminar in nature, it can also be more smoothly blended with the flow downstream (i.e., along the remainder of the fuselage), reducing drag.

As before, when the airflow (B) remains attached to the top surface 311 of the forward gate 305, the area of turbulent flow along the forward gate 305 is reduced or eliminated. This increases the efficiency of the system 300 and reduces noise caused by turbulence and supersonic flow, among other things. In addition, behind the aft gate 310, the main airflow (B) can be smoothly blended such that turbulence along the fuselage 345 downstream from the system 300 can also be minimized. In other words, because the turbulence of the main flow (B) through the system 300 is reduced, the flow (B) introduces less turbulence to the airflow over the remainder of the fuselage.

In still other embodiments, as shown in FIG. 3d, the system 300 can include one or more active flow control devices 390, such as jet actuators, which can be used to energize the boundary layer. In some examples, the active flow control devices 390 may include fluidic actuators, which inject high speed air into the boundary layer. In further examples, the active flow control devices 390 may include zero net mass-flux actuators (e.g., synthetic jet actuators), for example, which are basically miniature speakers configured to act in a coordinated effort to move the boundary layer via acoustic pressure waves. In still other embodiments, the system 300 could utilize surface cooling to reduce the size of the boundary layer. The system 300 can also comprise active vortex generators configured to change in size, position, orientation, and/or oscillation according to different flow conditions to encourage mixing of the boundary layer flow with mainstream flow to delay, or prevent, flow separation.

It will be appreciated that the terms forward and aft, when describing the gates 305, 310, and the terms top and bottom, when describing the exterior surfaces of the gates 305, 310, are used for illustration purposes only and do not limit the scope of the present disclosure. For example, in some embodiments, in which the system 300 is arranged along a lower portion of an aircraft fuselage, the gates may be oriented as depicted in FIGS. 4a-4d. In some examples, such as when the system 300 is positioned elsewhere along the fuselage (e.g., sides or upper surfaces of the fuselage) or coupled to other portions of a vehicle, the gates may be oriented differently, thus the terms "top" and "bottom" as wells as "forward" and "aft" are not intended to limit the scope of the disclosure.

In some embodiments, the first interior cavity 360a of the aft gate 310 can also comprise a pressure and/or flow sensor 365 to monitor air flow and pressure through the aft gate 310. This may be useful, for example, to monitor and vary airflow through the aft gate 310 as system 300 requirements change due to changes in, for example, cabin pressure, atmospheric pressure, or both. Suitable pressure sensors include, but are not limited to, mechanical sensors, piezoelectric sensors, and strain gauges. In some embodiments, the pressure sensor can be a silicon on sapphire or quartz pressure transducer. In some embodiments, air flow sensors can comprise, for example and not limitation, hot wire mass air flow sensors, pitot tubes, or mechanical gauges. In other embodiments, air flow can also be measured via a differential pressure transducer using the resistance across an element (e.g., an orifice or venturi).

Providing airflow through the forward gate 305 can enable laminar flow through the system 300 whereby flow through the system may be increased, while noise caused by the system 300 is decreased. This, in turn, may require less sound insulation to meet comfort and safety requirements. In addition, the effect on boundary layer thickness on the outside of the aircraft may be reduced because the flow exiting the system 300 is substantially laminar.

Figure 4:
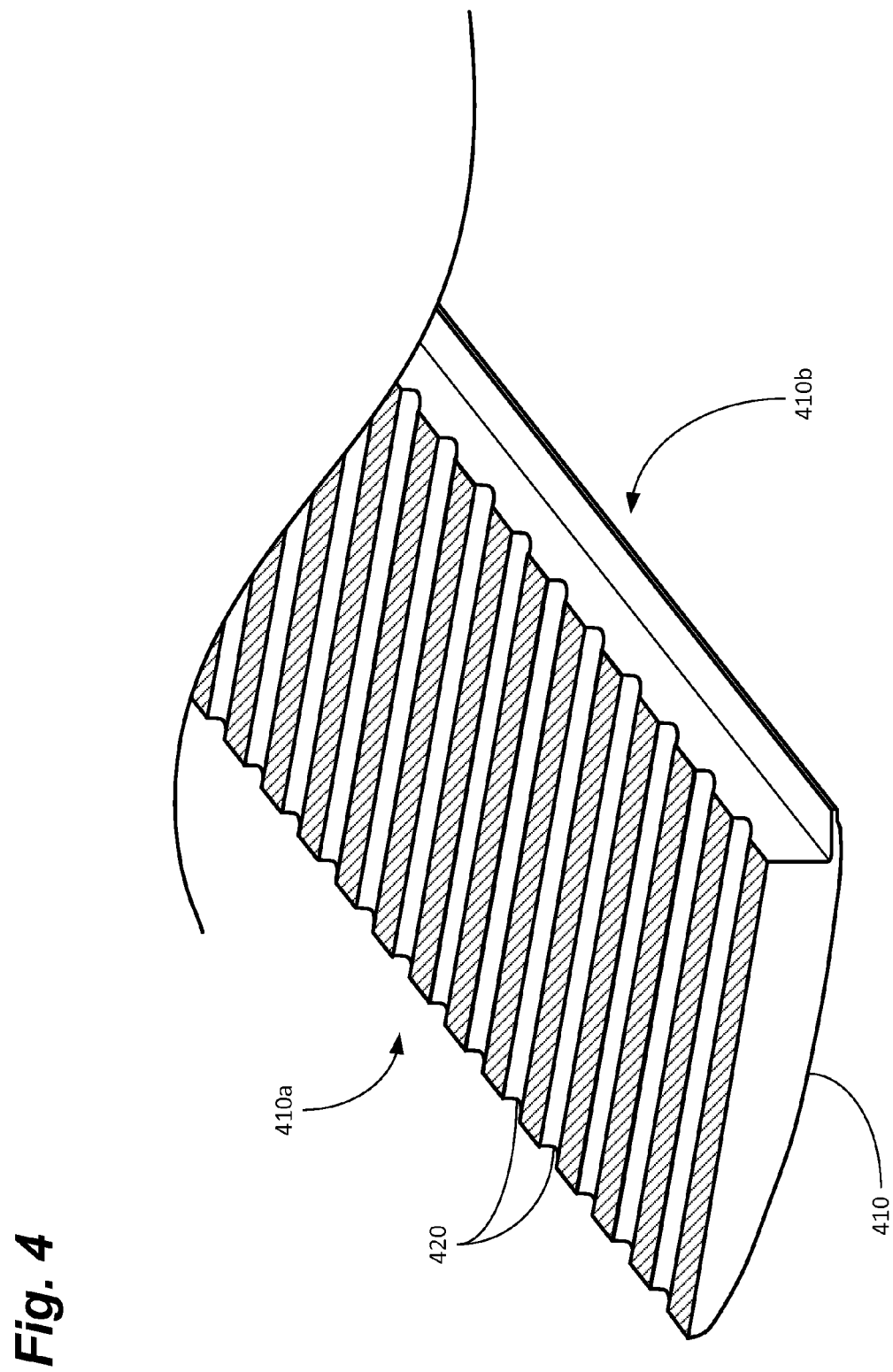
FIG. 4 is a cross sectional view of a gate for a CPOV incorporating interior channels, in accordance with some embodiments of the present disclosure.

FIG. 4 illustrates a partial cross-section of an aft gate according further examples of the present disclosure. In some embodiments, rather than having an interior cavity 360, the aft gate 410 can comprise a plurality of channels 420, or corrugations, leading from the first end 410a of the aft gate 410 to the second end 410b of the aft gate 410. Like the interior cavity 360, the channels 420 can provide fluid communication between the first end 410a of the aft gate 410 to the second end 410b of the aft gate 410. In this configuration, however, the channels 420 may provide additional structural rigidity to the aft gate 410 if desired. In this manner, deflection or distortion of the aft gate 410 due to aerodynamic forces can be minimized.

Figure 5:
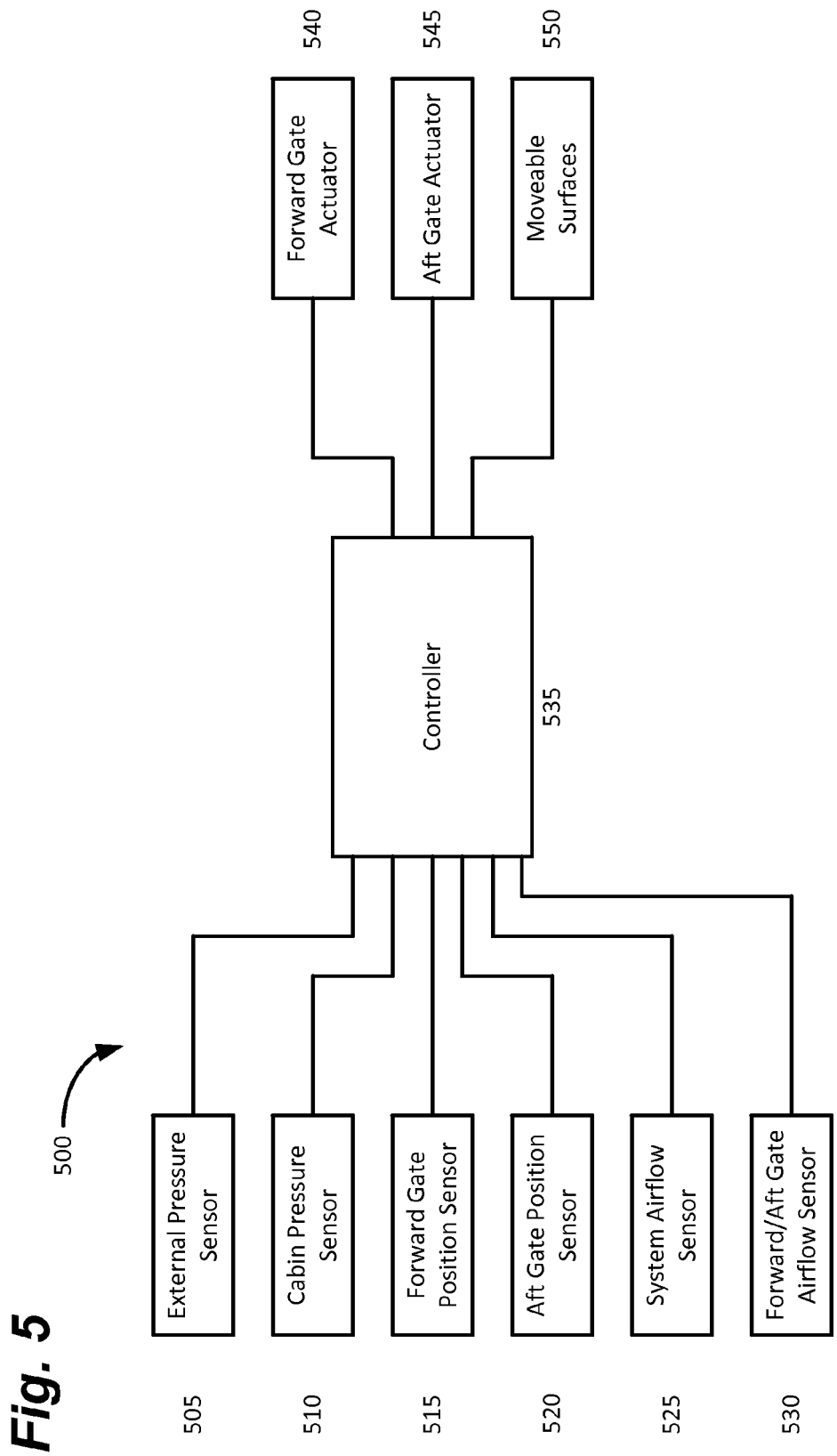
FIG. 5 depicts a control system for maintaining the cabin pressure of a vehicle, in accordance with some embodiments of the present disclosure.

As shown in FIG. 5, embodiments of the present disclosure can also comprise a control system 500 for maintaining cabin pressure. The control system 500 can comprise a number of inputs including, for example, an external (or, "atmospheric") pressure sensor 505, an internal (or, "cabin") pressure sensor 510, a forward gate position sensor 515, and an aft gate position sensor 520. In some embodiments, the control system 500 can also use one or more airflow sensors. The control system 500 can use, for example, a first airflow sensor 525 for measuring the flow through the entire system. In some embodiments, the control system 500 can also use a one or more airflow sensors 530 to measure the portion of the flow passing through the first interior cavity in the aft gate and/or the second interior cavity in the forward gate.

The control system 500 can also comprise a controller 535 for receiving inputs from the various sensors and providing various outputs to maintain the desired cabin pressure. The controller 535 can comprise, for example and not limitation, a CPU, microcontroller, or integrated circuit (e.g., a field programmable gate array (FPGA) or application specific integrated circuit (ASIC). If, for example, the system 500 is set to maintain a set altitude equivalent (e.g., 6,000-8,000 feet ASL), for example, and the cabin pressure sensor 510 measures an altitude equivalent that is too low (e.g., 4,000 feet ASL), which creates a higher pressure differential and may cause undue stress on the fuselage, the controller can open the forward gate, the aft gate, or both to reduce the cabin pressure. Of course, the converse is also true and, if the altitude equivalent is too high (e.g., 16,000 feet ASL), which can cause hypoxia, headache, and altitude sickness, among other things, the gates can be closed partially or fully to increase cabin pressure.

To control cabin pressure, the outputs for the controller 535 can be an open or close signal to the forward gate actuator 540, the rear gate actuator 545, or both. In addition, the controller 535 can also monitor airflow through the aft gate and/or the forward gate using, for example, one or more airflow sensors 530. If the flow through the aft gate (or the forward gate) is not within a predetermined range (e.g., a set mass air flow or a percentage of total flow), for example, the controller 535 can also send an open/close (and/or on/off) signal to the one or more moveable surfaces 550 (e.g., the fan 370 and/or louvers 375, discussed above). In this manner, the total flow through the system and the volume of airflow that bypasses through the aft gate, the forward gate, or both can be varied.

In some embodiments, the comparison of the two pressure sensors 505, 510 along with feedback from the position sensors 515, 520 can be used to calculate the airflow through the system indirectly (i.e., the area of the opening between the gates is known for each gate position). In other embodiments, the airflow rate can be measure directly (or redundantly) with the airflow sensors 525, 530.

Figure 6B:
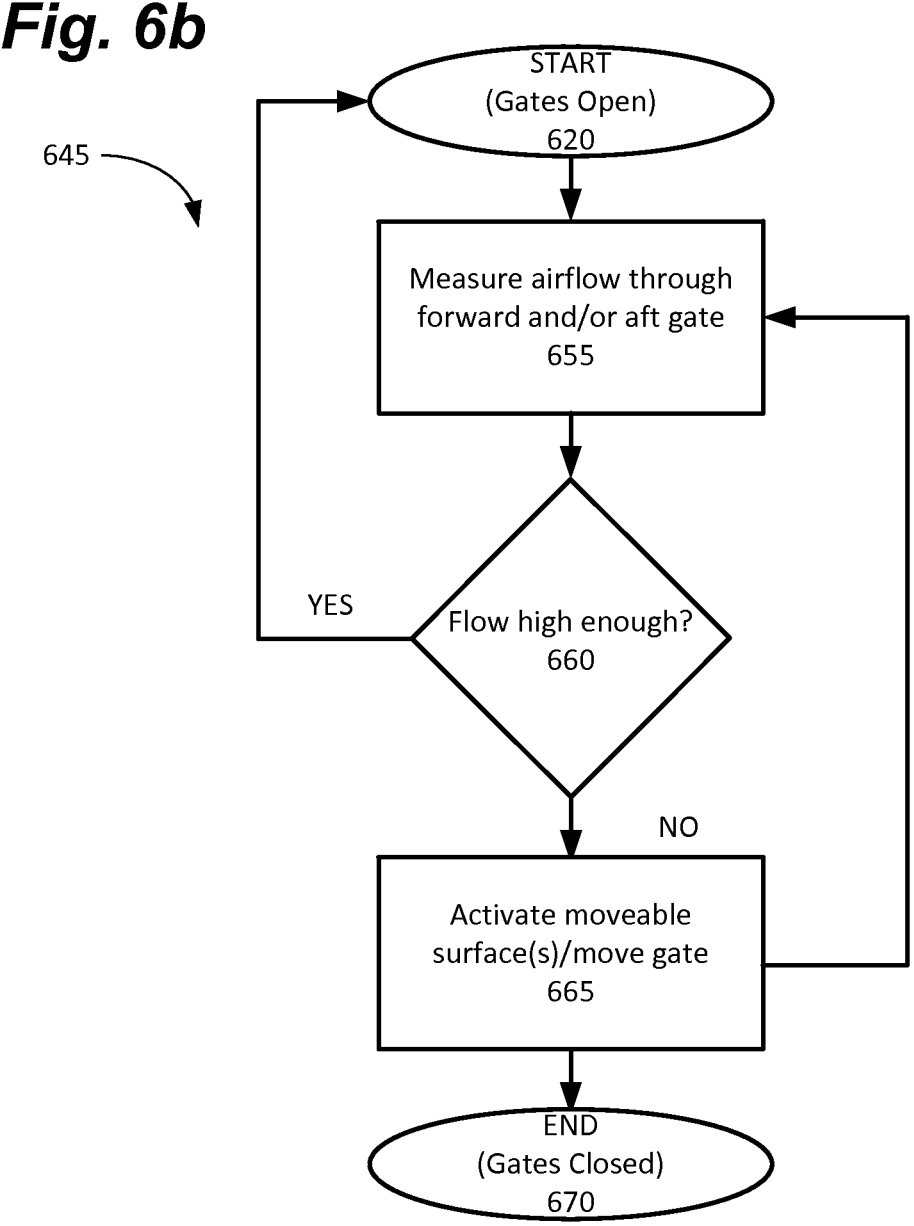

With reference to FIGS. 6a and 6b, methods for managing a flow through cabin outflow pressure valves according to the present disclosure are described. As shown in FIG. 6a, a method 600 can comprise a feedback method in which cabin pressure is measured continuously, or at predetermined intervals (e.g., once per second), and is adjusted by opening and closing the forward and aft gates. For example, the method can begin with both gates closed and the cabin unpressurized, as shown at 605. This situation would occur, for example, when the aircraft is at the airport departure gate and the aircraft has not yet been pressurized prior to flight. As the outer passenger door(s) of the aircraft are closed and sealed, the method 600 may continue by measuring the cabin pressure, as shown at 610, to determine if the cabin pressure is above or below a predetermined pressure, as shown at 615 (e.g., 8,000 feet ASL).

If the pressure is determined to be at or below the predetermined pressure, the forward and aft gates can remain closed to enable a pressurization system of the aircraft to raise the cabin pressure. If, on the other hand, the cabin pressure is determined to be above the predetermined level, for example, the forward and/or aft gates can be opened, as shown at 620, to vent excess cabin pressure into the atmosphere, with a portion of the flow directed through an interior of the forward gate, aft gate, or both, as shown at 625, to promote more laminar flow (either passively or actively, as described above). In some embodiments, when the aircraft has completed its journey, the cabin and atmospheric pressure can be equalized and the gates closed, as shown at 630.

With reference to FIG. 6b, a method 645 for monitoring flow (or pressure) through an outflow valve is described. As shown at 620, the method may begin with the gates open. The flow (or pressure) through the interior of the forward gate and/or aft gate can be measured with one or more flow and/or pressure sensors, as shown at 655. If the flow through the forward or aft gate is determined to be too low, as shown at 660, the forward gate, aft gate, and/or the one or more moveable surfaces can be activated, as shown at 665 to increase the flow therethrough. A suitable amount of flow can be calculate based on a number of factors including, but not limited to, the specific geometry of gates (e.g., length, width, curvature, and surface roughness), Reynolds number, pressure differential, temperature, density, and viscosity.

As mentioned above, the portion of the flow (e.g., A, C) can be redirected through the interior of the forward gate and/or aft gate to cause a portion of the flow (B) (i.e., the main flow between the gates) to remain attached to exterior surfaces of the gates (e.g., the lower surface 309 of the aft gate 310 and/or the upper surface 307 of the forward gate 305) thus substantially preventing flow separation and increasing laminar flow through the valve. The amount of flow through the forward gate and/or aft gate which may prevent separation can be, for example and not limitation, a percentage of the total flow or a predetermined constant flow rate. As further shown at 660, if the flow through the forward and/or aft gates is determined to be adequate, then the process can repeat starting at step 645 while the gates remain open 620. As shown at 670, the process terminates when the gates are closed.

The amount of airflow redirected or bypassed through the either of the gates 305, 310 may depend on, among other things, the size and shape of the gates 305, 310, the design pressure differential between cabin and atmospheric pressure, and the surface smoothness of the gates 305, 310. A higher pressure differential between the interior of the aircraft ("cabin pressure") and the exterior of the aircraft ("atmospheric pressure"), for example, will naturally cause a higher flow rate through the system 300. One of skill in the art will recognize that the amount of passive and/or active bypass may need to be adjusted based on these and other factors including, but not limited to, air speed, altitude, temperature, aircraft size and shape, pressure, density, and mass flow rate.

In some embodiments, the system 300 sizing can be determined empirically for a particular aircraft and flight regime using, for example, a computational fluid dynamics (CFD) model. In some embodiments, to verify the CFD model, empirical calculation can be followed by lab testing (e.g., in a wind tunnel or pressure cell). The system 300 can be configured to maintain a mass flow through the aft gate 310 that is greater than the estimated boundary layer of the main nozzle 350. Of course, eventually the system 300 will be limited as the flow chokes at the critical pressure ratio (e.g., for standard air $P_2 = 0.528\ P_1$).

By providing a first permeable surface 340a on the leading edge of the aft gate 310, for example, the air flow boundary layer is force to adhere to the aft gate surface as air is extracted, channeled through, and exhausted out the second permeable surface 340b in the aft gate 310. This reduces, or eliminates, noise by maintaining laminar flow through the main nozzle 350. Additionally, drag is reduced and flow increased by the redirection of the air jet close to the airplane fuselage.

While several possible embodiments are disclosed above, embodiments of the present disclosure are not so limited. For instance, while several possible configurations have been disclosed (e.g., embodiments with and without moveable surfaces inside the aft gate), other suitable configurations and materials could be selected without departing from the spirit of the disclosure. In addition, the location and configuration used for various features of embodiments of the present disclosure such as, for example, the gates, actuators, and sensors, can be varied according to a particular aircraft or application that requires a slight variation due to, for example, the size or construction of the aircraft, or weight or power constraints. Such changes are intended to be embraced within the scope of this disclosure.

The specific configurations, choice of materials, and the size and shape of various elements can be varied according to particular design specifications or constraints requiring a device, system, or method constructed according to the principles of this disclosure. Such changes are intended to be embraced within the scope of this disclosure. The presently disclosed embodiments, therefore, are considered in all respects to be illustrative and not restrictive. The scope of the disclosure is indicated by the appended claims, rather than the foregoing description, and all changes that come within the meaning and range of equivalents thereof are intended to be embraced therein.

The invention claimed is:

1. A valve for regulating an interior pressure of a vehicle, comprising:
   a first gate, positionable between a closed position and an open position, the first gate comprising:
   a first interior cavity;
   a first permeable surface located proximate a leading edge of the first gate and in fluid communication with the first interior cavity, wherein the first permeable surface places an interior portion of the vehicle in fluid communication with the first interior cavity; and a second permeable surface located proximate a trailing edge of the first gate and in fluid communication with the first interior cavity, wherein the second permeable surface places the first interior cavity in fluid communication with an atmosphere surrounding the vehicle such that a pressure differential between the interior pressure and an atmospheric pressure of the atmosphere causes airflow through the first interior cavity; and
   further comprising one or more movable surfaces disposed with the first interior cavity proximate the first permeable surface, the second permeable surface, or both, wherein the one or more movable surfaces are movable to vary an area of the first permeable surface, the second permeable surface, or both for controlling the airflow through the first interior cavity; wherein the one or more moveable surfaces comprise one or more of louvers proximate the first permeable surface, and one or more fans proximate the second permeable surface.

2. The valve of claim 1, wherein the first permeable surface and the second permeable surface each comprise a plurality of holes; and
wherein the plurality of holes are sized and shaped such that moving the first gate from the closed to the open position causes air to flow through the first interior cavity.

3. The valve of claim 1, wherein the first gate includes an active flow control device proximate at least one of the first permeable surface and the second permeable surface for energizing a boundary layer in a flow around the first gate.

4. The valve of claim 1, wherein the first interior cavity comprises a plurality of channels fluidly coupling the first permeable surface to the second permeable surface.

5. The valve of claim 1, further comprising a second gate positionable between a closed position and an open position, and defining a second interior cavity;
wherein the first gate is an aft gate and the second gate is a forward gate.

6. The valve of claim 5, wherein the forward gate comprises:
a third permeable surface located proximate an upstream portion of the forward gate and in fluid communication with the second interior cavity, wherein the third permeable surface places the interior portion of the vehicle in fluid communication with the second interior cavity; and
a fourth permeable surface located proximate a downstream portion of the forward gate and in fluid communication with the second interior cavity, wherein the fourth permeable surface places the second interior cavity in fluid communication with the atmosphere surrounding the vehicle such that the pressure differential between the interior pressure and the atmospheric pressure of the atmosphere causes airflow through the second interior cavity.

7. The valve of claim 6, wherein one or more of the first permeable surface, the second permeable surface, the third permeable surface, and the fourth permeable surface comprises a plurality of holes.

8. A system for regulating an interior pressure of a vehicle, comprising:
a valve, comprising:
a first gate, positionable between a closed position and an open position, the first gate comprising:
an interior cavity;
a first permeable surface located proximate a leading edge of the first gate and in fluid communication with the interior cavity, wherein the first permeable surface places an interior portion of the vehicle in fluid communication with the interior cavity; and
a second permeable surface located proximate a trailing edge of the first gate and in fluid communication with the interior cavity, wherein the second permeable surface places the interior cavity in fluid communication with an atmosphere surrounding the vehicle such that a pressure differential between the interior pressure and an atmospheric pressure of the atmosphere causes airflow through the interior cavity;
an actuator coupled to the first gate and operable to move the first gate between the closed and open positions; and a controller configured to transmit signals to the actuator for controlling movement of the first gate;
wherein the valve is movably coupled to an aircraft, the system further comprising:
a sensor disposed within the interior cavity configured to measured one or more parameters of the interior cavity and transmit the one or more parameters to the controller; and
wherein the measured parameter is a flow through the interior cavity, the system further comprising:
one or more movable surfaces disposed with the interior cavity proximate at least one of the first and second permeable surfaces and movable to vary an area of the first permeable surface, the second permeable surface, or both for controlling the airflow through the interior cavity; and
wherein the controller is further configured to transmit a signal to the one or more movable surfaces to move to increase or decrease the flow through the interior cavity.

9. The system of claim 8, wherein the first gate is movably coupled to a first portion of the vehicle such that moving the first gate from the closed position to the open position causes the airflow from the interior portion of the vehicle to an the atmosphere surrounding the vehicle, a portion of the airflow passing through the interior cavity.

10. The system of claim 8, wherein the first gate includes an active flow control device proximate at least one of the first permeable surface and the second permeable surface for energizing a boundary layer of flow around the first gate.

11. The system of claim 8, wherein the first gate is movably coupled to an aft portion of a fuselage of an aircraft.

12. A method of operating a valve, comprising:
moving a first gate of a valve, the valve arranged in fluid communication with an interior and exterior of a vehicle, between a first, closed position and a second, open position to allow air to flow out of the interior of the vehicle;
wherein a first portion of the airflow travels over an external surface of the first gate; and
wherein a second portion of the airflow travels from the interior of the vehicle through a first interior cavity of the first gate and out to the exterior of the vehicle; and further comprising:
measuring the airflow through the first interior cavity of the first gate; and
moving one or more moveable surfaces attached to the first gate and located proximate the one or more permeable surfaces to decrease or increase the airflow through the first interior cavity of the first gate.

13. The method of claim 12, wherein the valve further comprises a second gate, the method further comprising:
moving the first gate, the second gate, or both between a first, closed position and a second, open position to allow air to flow therethrough;
wherein the first portion of the airflow travels over the external surface of the first gate and an external surface of the second gate; and
wherein the second portion of the airflow travels from the interior of the vehicle through the first interior cavity of the first gate and out to the exterior of the vehicle.

14. The method of claim 13, wherein the second gate defines a second interior cavity and comprises one or more permeable surfaces; and
wherein a third portion of the airflow travels from the interior of the vehicle through the second interior cavity and out to the exterior of the vehicle.

15. The method of claim 12, wherein first gate comprises a first permeable surface located on an upper surface and a lower surface of the first gate.

\* \* \* \* \*